United States Patent

Barnes et al.

[15] 3,662,370
[45] May 9, 1972

[54] CONE DISC LOCK-ON SWITCH

[72] Inventors: Charles M. Barnes, St. Joseph, Mich.;
Blair H. Schlender, Richardson, Tex.

[73] Assignee: The Bendix Corporation

[22] Filed: June 15, 1970

[21] Appl. No.: 46,058

[52] U.S. Cl. ..........................340/240, 188/151 A, 303/6 C, 200/82 D
[51] Int. Cl. .........................................................G08b 21/00
[58] Field of Search.................340/240, 248, 52 C; 335/188; 200/82 D, 67 DA, 67 DB, 153 LA; 188/151 A; 303/6 C

[56] References Cited

UNITED STATES PATENTS 3,434,286 3/1969 Raizes...........................200/82 D UX
3,031,548 4/1962 Robinson.......................200/82 D X
3,542,438 11/1970 Falk...................................340/52 C X

*Primary Examiner*—John W. Caldwell
*Assistant Examiner*—Daniel Myer
*Attorney*—W. N. Antonis and Plante, Hartz, Smith and Thompson

[57] ABSTRACT

A warning switch is disclosed for indicating a pressure differential between front and rear braking systems which includes an electrical terminal connected in series with a warning device. A piston is shifted by a pressure differential between the front and rear systems to reciprocate a plunger which forces a resilient cone disc from a first position in which the disc is spaced from the terminal to a second position in which the disc completes an electrical circuit between the terminal and the grounded switch housing.

4 Claims, 2 Drawing Figures

PATENTED MAY 9 1972

3,662,370

INVENTOR.
CHARLES M. BARNES
& BLAIR H. SCHLENDER
BY
Ken C. Decker
ATTORNEY

CONE DISC LOCK-ON SWITCH

BACKGROUND OF THE INVENTION

This invention relates to a warning device to indicate a loss of pressure in one side of a dual hydraulic vehicular braking system.

In a vehicle having a braking system incorporating a split system master cylinder two separate fluid systems connect the master cylinder to the front and rear brakes respectively for simultaneously actuating the latter. If the hydraulic system for one set of brakes should fail, the other set of brakes will still operate. However, although the pedal effort required to stop the vehicle is much greater if only one set of brakes are operative, the operator might not realize that one set of brakes is not functioning. Therefore, it is desirable that a warning device be provided in the operator's compartment to indicate a failure in one of the hydraulic systems. Existing warning devices, however, provide a warning signal only while the brakes are applied. When the brakes are released, existing warning devices are deactivated. Since it is likely that vehicle operators might overlook a signal that appears only while the brakes are applied, it is desirable to provide a warning switch that after an initial failure in one set of brakes of the system continuously warns the operator of the defective brakes.

SUMMARY OF THE INVENTION

Therefore, an important object of our invention is to provide a vehicular braking system malfunction indicator which upon actuation by a lowered hydraulic pressure in one side of a dual hydraulic brake system continuously warns the operator until reset by a repairman.

Another important object of my invention is to provide a latching warning switch for indicating a malfunction in a vehicular braking system which can be easily reset by a repairman upon repair of the brakes.

Yet another important object of our invention is to provide a warning switch which is maintained in a locked position until reset.

DETAILED DESCRIPTION

Figures 1, 2:
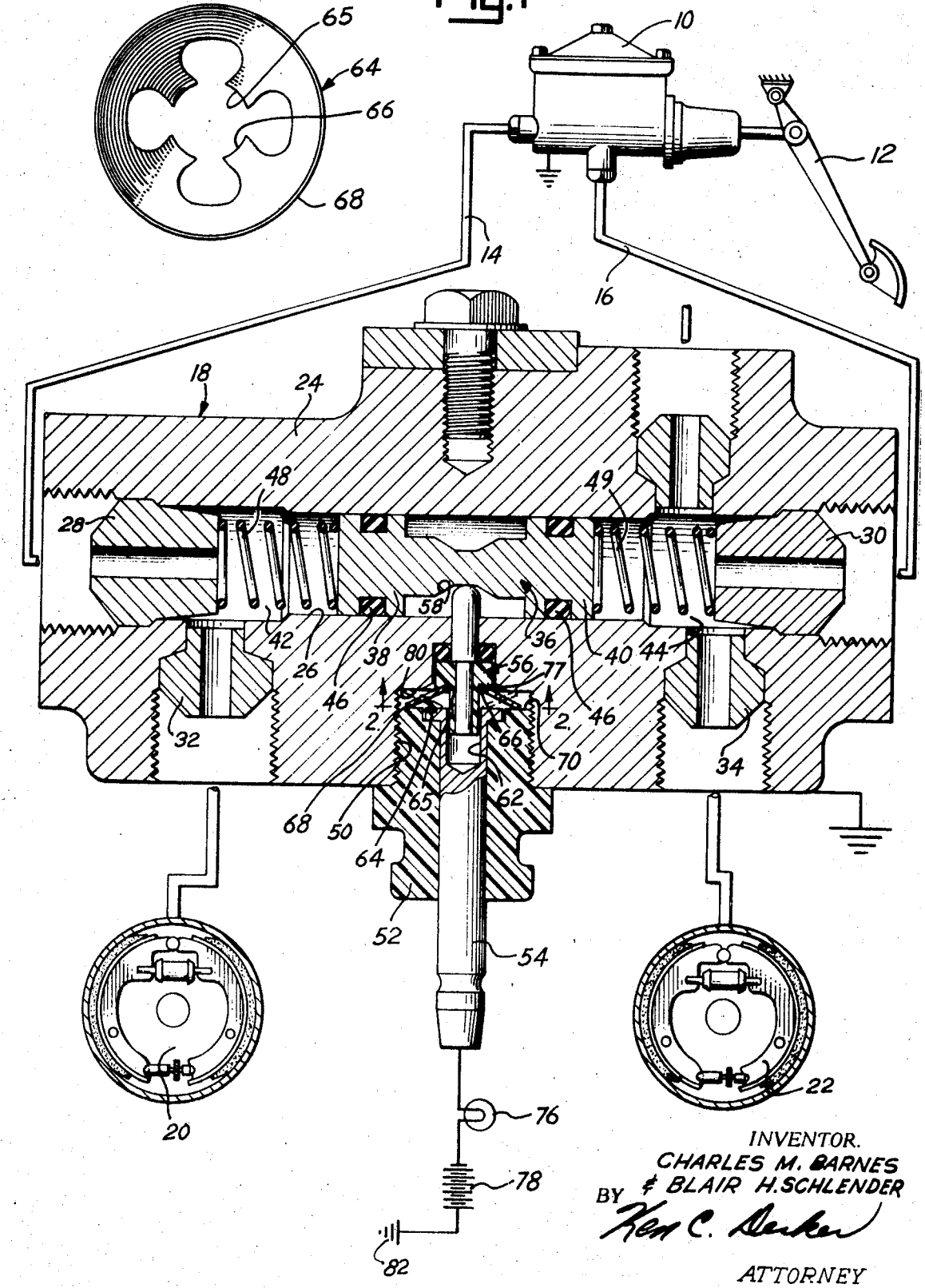
FIG. 1 is a schematic view of a brake system with a cross-sectional view of a warning switch made pursuant to the teachings of my present invention.
FIG. 2 is a cross-sectional view taken along lines 2—2 of FIG. 1.

Referring now to the drawings, fluid pressure is developed in a master cylinder 10 by operation of a pedal 12 mounted in the vehicle operator's compartment. Master cylinder 10 is of the split system type and therefore develops fluid pressure in each of a pair of hydraulic system 14 and 16. Each of the hydraulic systems 14 and 16 are connected to opposite sides of a differential pressure warning switch 18 which is mounted at any convenient place on the vehicle, such as the firewall, where the switch 18 may be electrically grounded. The systems 14 and 16 are then connected to the front and rear brakes 20 and 22 respectively.

Switch 18 includes a housing 24 defining a bore 26 therewithin having a pair of inlet ports 28, 30 and a pair of outlet ports 32, 34. Each of the hydraulic systems 14 and 16 is connected to a corresponding inlet port and outlet port. A piston 36 having a pair of opposed end faces 38, 40 is reciprocable in the bore 26, dividing the latter into a pair of chambers 42, 44 defined by the faces 38, 40 and corresponding ends of the housing. Seals 46 are provided between the piston 36 and the bore 26 to prevent fluid from escaping from the bore 26. Springs 48, 49 are interposed between each of the faces 38, 40 and a corresponding end of the bore 26 and act to yieldably maintain the piston 36 centered in the bore.

Housing 24 further includes a transverse bore 50 that threadedly receives an electrically non-conductive fitting 52 that houses an electrical terminal 54. A plunger 56, supported by the housing 24 coaxially with the terminal 54, extends into the bore 26. Piston 36 includes a camming surface 58 that engages the plunger 56 to reciprocate the latter in a direction substantially perpendicular to the axis of the bore 26. Plunger 56 is electrically non-conductive, and slides in a blind bore 62 in the terminal housing. A resilient, truncated conical disc 64 has an inner peripheral edge 66 that surrounds the plunger 56 and an outer peripheral edge 68 that slidably engages the transverse surface 70 on the fitting 52. Plunger 56 extends through a central opening 65 in the disc 64 and has a radially extending portion 77 that engages one side of the disc 64. A warning device 76 is connected in series to the end of the terminal 54, the vehicle's storage battery 78, and to an electrical ground at 82.

MODE OF OPERATION

Assuming no malfunction in the braking system, piston 36 will remain centered in the bore 26 due to the action of the springs 48, 49. Therefore, as long as the pressures in the hydraulic systems 14 and 16 are equal, the plunger 56 remains in the deactivated position illustrated in FIG. 1.

In this position, the outer edge 68 of the disc 64 engages the non-conductive surface 70 and the inner edge 66 of the disc 64 engages the plunger 56. Since the terminal 54 is electrically isolated from the housing 24, an open circuit exists through the warning device 76. However, should a failure in one of the systems 14 or 16 reduce the pressure in one of the chambers 42 or 44, the higher pressure in the other chamber will force the piston 36 toward the chamber with the lowered pressure. As the piston 36 shifts, the plunger 56 will be forced toward the terminal 54 by the camming surfaces 58. Due to the engagement of the plunger 56 with the inner edge 66 of the disc 64, the inner edge 66 will also be driven toward the terminal 54. Due to the resiliency of the disc, at some point during the movement of the plunger 54, the disc 64 will snap through center to an inverted position shown in dashed lines in FIG. 1, thereby driving the inner peripheral edge 66 of the disc 64 into engagement with the terminal 54 and the outer peripheral edge 68 of the disc into engagement with the surface 80 on the housing 24. An electrical circuit is thus completed from the ground 82 through the storage battery 78, the warning device 76, the terminal 54, the disc 64 to the ground housing 24, thereby actuating the warning device 76. Terminal 54 is slidably mounted in the fitting 52, so that when the brakes are repaired, the mechanic may reset the switch by forcing the terminal 54 toward the bore 26, thereby forcing the disc 64 to its initial position with the inner and outer peripheral edges 66 and 68 engaging the plunger 56 and surface 70 respectively, terminating operation of the warning device.

We claim:

1. Switch means responsive to differential pressure between first and second hydraulic systems comprising:
    a housing having a bore therein;
    a piston located in said bore having a pair of opposed faces;
    first and second chambers located in the bore defined by the respective faces on the piston and corresponding ends of the bore, said first and second chambers being in fluid communication with said first and second hydraulic systems respectively;
    an electrical terminal carried by the housing for transmitting a signal to a warning device;
    a plunger member retained in the housing having an end extending into said bore, said piston displacing said plunger from a first position to a second position in response to movement of said piston from a pressure differential between the first and second hydraulic systems;
    truncated conical disc means surrounding said plunger means, said truncated conical disc means being correspondingly moved from an inactive position to an active position as said plunger member is shifted from said first position to said second position, said truncated conical disc means in said active position providing continuity between said housing and said electrical terminal to permit said electrical signal to activate said warning device, said truncated conical disc means being maintained in the active position through inherent resiliency until manually repositioned regardless of said plunger member later shifting between said first and second positions.

2. The invention of claim 1:

said housing having a transverse bore;

an electrically non-conductive fitting in said transverse bore;

said fitting carrying said electrical terminal;

said plunger member shifting said truncated conical disc from an inactive position interconnecting the plunger member and the fitting to an active position wherein the truncated conical disc provides an electrically conductive path between said electrical terminal and said housing.

3. The invention of claim 2:

said truncated conical disc having an aperture extending therethrough defining an inner peripheral edge of said truncated conical disc extending around said aperture;

the inner and outer peripheral edges of said truncated conical disc engaging said plunger member and said fitting respectively when the truncated conical disc is in the inactive position and engaging said electrical terminal and said housing respectively when the truncated conical disc is in the active position.

4. The invention of claim 2:

said electrical terminal being slidable within said fitting;

said plunger member engaging one side of said truncated conical disc when forcing the latter from said inactive position to the active position;

said electrical terminal engaging the other side of the truncated conical disc upon sliding of the electrical terminal within the fitting to return the truncated conical disc to the inactive position from the active position.

* * * * *